United States Patent [19]
Kling et al.

[11] Patent Number: 5,878,215
[45] Date of Patent: Mar. 2, 1999

[54] SYSTEM AND METHOD FOR PROCESSING MULTIPLE ELECTRONIC TRANSACTION REQUESTS

[75] Inventors: Constance W. Kling; Jay S. Levy, both of St. Louis, Mo.; Cheryl A. Meliones, Waltham, Mass.

[73] Assignee: MasterCard International Incorporated, Purchase, N.Y.

[21] Appl. No.: 247,343

[22] Filed: May 23, 1994

[51] Int. Cl.⁶ ...................................................... G06F 17/60
[52] U.S. Cl. ................. 395/200.37; 370/282; 395/200.7; 705/8; 705/42; 705/43
[58] Field of Search .................................... 364/401, 406, 364/408; 370/60, 61; 395/200, 200.37, 200.7; 705/8, 42, 43

[56] References Cited

U.S. PATENT DOCUMENTS

| | | |
|---|---|---|
| 4,621,326 | 11/1986 | Rawlins . |
| 5,006,983 | 4/1991 | Wayne et al. . |
| 5,113,499 | 5/1992 | Ankney et al. . |
| 5,124,978 | 6/1992 | Chao . |
| 5,175,682 | 12/1992 | Higashiyama . |
| 5,220,501 | 6/1993 | Lawlor et al. . |
| 5,239,662 | 8/1993 | Danielson et al. . |
| 5,278,984 | 1/1994 | Batchelor ................................. 395/650 |
| 5,282,203 | 1/1994 | Oouchi . |
| 5,325,356 | 6/1994 | Lyles . |
| 5,345,558 | 9/1994 | Opher et al. . |
| 5,379,297 | 1/1995 | Glover et al. . |
| 5,381,410 | 1/1995 | Grenot . |
| 5,506,966 | 4/1996 | Ban .......................................... 395/250 |
| 5,594,872 | 1/1997 | Kawano et al. .................... 395/200.15 |
| 5,617,541 | 4/1997 | Albanese et al. ................... 395/200.13 |
| 5,694,616 | 12/1997 | Johnson et al. .......................... 395/860 |

OTHER PUBLICATIONS

American National Standard for Electronic Data Exchange, Application Control Structures, ANSI X12.6–1992, version 3000, pp. 393–406.

International Organization for Standardization, Report No. 9735, Electronic Data Interchange for Administration, Commerce and Transport—Application level syntax rules, 1990, pp. 1–19.

*Primary Examiner*—Emanuel Todd Voeltz
*Assistant Examiner*—William N. Hughet
*Attorney, Agent, or Firm*—Baker & Botts, L.L.P.

[57] ABSTRACT

The present invention provides for a system and method for processing multiple electronic messages in one transmission, or data group, and responding individually to the service requests based on urgency indicators present in the data group. The disclosure describes a system that contains a switch and includes remote access devices, financial institution computers, and service provider computers all connected to the switch. Customers at remote access devices select desired services and the remote access devices construct a data group containing service requests consistent with the protocol described in the invention. The data group includes urgency indicators associated with each service requested. The urgency indicators can represent three different modes: transaction interactive, batch-interactive, or non-interactive. Depending upon the indicator, the switch will respond to the remote access devices either immediately, in a single response after the entire service request is received, or not at all, respectively. The switch will then communicate with the appropriate financial institution computer, service provider computer or remote access device to complete the transaction.

19 Claims, 6 Drawing Sheets

SYSTEM AND METHOD FOR PROCESSING MULTIPLE ELECTRONIC TRANSACTION REQUESTS

TECHNICAL FIELD

This invention relates to data communications generally and more particularly to a communications network system or method for processing service request messages to conduct electronic transactions including financial transactions.

BACKGROUND OF THE INVENTION

Financial operations today are not restricted to face to face transactions with a bank teller or broker for every financial service desired by a customer. There are presently numerous ways to complete an electronic transaction remotely with a financial institution or service provider using external devices that can communicate with the bank over long distances via transmission lines. These external devices currently include automatic teller machines (ATMs), point-of-sale devices, home computers, touch-tone telephones, and intelligent phones capable of data and video display. The external devices can either connect to a financial institution or service provider directly via modem or be connected to a central switch that processes the transmissions and further communicates with the appropriate financial institution or service provider. The switch receives transmissions from the external devices, financial institutions and service providers constructed in a predetermined format called a protocol. The data carried in the transmissions are arranged in data constructs called data groups. Data groups must follow the prescribed protocol in order for the switch to properly interpret the information transmitted. Protocols typically require data items called "headers" and "trailers" to delineate when a group of messages start and end. There is always a corresponding trailer for each header transmitted.

U.S. Pat. No. 5,220,501 issued Jun. 15, 1993 to Lawlor et. al. discloses a method and system for conducting financial transactions using remote terminals. The remote terminals are connected to a central computer by a network switch. The central computer receives service requests from the remote terminals and then transmits messages over a conventional ATM network to a bank to complete a financial transaction. An example of a transaction performed by the system is cash withdrawal which debits a payer's account. Lawlor, however, does not disclose any particular protocol by which the service request data is transmitted. Lawlor discloses only a high level system and does not describe the details of the composition of the actual transmission.

There are a number of standard protocols that are used today and followed by programs run on external terminals that need to properly communicate with a central switch or other computer. One such protocol is the American National Standard for Electronic Data Interchange (ANSEDI) developed by the Accredited Standards Committee X12 and approved by the American National Standards Institute. ANSEDI can be used by a variety of industries including transportation, insurance, and retail purchasing to communicate information between two data processing systems. The ANSEDI protocol can also be used to transmit financial information.

The ANSEDI protocol requires data groups to be constructed with a particular arrangement of control messages. Each data group must start with a functional group header. Next, a transaction set header must be placed in the data group to designate a transaction set. Then a loop header designates the start of a bounded loop of data messages but is not part of the loop itself. Next, an inner loop header starts an inner, nested bounded loop of message instructions. Each header has a corresponding trailer placed in the data group to complete each nested loop. They appear in the following order and correspond to a previous header: inner loop trailer, loop trailer, transaction set trailer, and functional group header. More than one transaction set may be used within one functional group. Also, more than one bounded loop may be used within each transaction set.

Another standard protocol that is used today is the Electronic Data Interchange for Administration, Commerce and Transport (EDIFACT) agreed to by the United Nations Economic Commission for Europe. This protocol can be used between different remote sites located in different countries in order to provide proper communication that can be interpreted by both remote sites. EDIFACT has the limitation of only allowing messages of one service type to be present in a single data group to be transmitted. Thus additional data groups including headers and trailers must be transmitted to another computer in separate transmissions rather than in a single transmission. The extra required data is a disadvantage over a system that can transmit all the service types in one data group thereby reducing the number of headers and trailers in the transmission. Reduced data in the transmission can save transmission costs and processing time.

SUMMARY OF THE INVENTION

The present invention provides for a system and method for processing multiple electronic transaction requests, or service requests, in one data group and responding to each service request individually based on urgency indicators present in the data group.

This invention allows for a single data group to contain multiple service requests which enables the entire transmission to be shorter thus lowering the cost of transmission. Processing time is also reduced with less data elements to analyze. The protocol, or predefined format for data groups according to the invention, contains urgency indicators associated with each service requested which define the desired priority of response for maximum efficiency of the data communications system. The response level may be transaction interactive, which requires an immediate response, batch interactive, which requires a single response to the entire transaction set, or non-interactive batch, which requires no response. The switch manages incoming transaction requests from all the remote access devices communicating with the system.

The system utilizing the protocol in accordance with the invention includes a switch, at least one remote access device connected to the switch, and at least one host computer connected to the switch. The host computer can be either a financial institution or service provider. A transaction is initiated by a customer requesting a number of electronic services at a remote terminal. The resident software on the remote access device constructs a data group that complies with the protocol of the invention. The access device then transmits the data group to the switch. The switch responds to the access device using the same protocol at a response priority based upon the urgency indicators in the data group. The switch then communicates with the appropriate financial institution or service provider to complete the transaction or processes the transaction itself and responds back to the access device. The protocol utilizing multiple service type messages and urgency indicators is a more efficient way to transmit, process and respond to transaction requests with fewer data elements and a faster response time.

BRIEF DESCRIPTION OF THE DRAWINGS

Further objects, features and advantages of the invention will become apparent from the following detailed description taken in conjunction with the accompanying figures showing a preferred embodiment of the invention, on which.

Throughout the figures, the same reference numerals and characters, unless otherwise stated, are used to denote like features, elements, components or portions of the illustrated embodiment. Moreover, while the subject invention will now be described in detail with reference to the figures, it is done so in connection with a preferred embodiment. It is intended that changes and modifications can be made to the described embodiment without departing from the true scope and spirit of the subject invention as defined by the appended claims.

DETAILED DESCRIPTION

The present invention is directed towards an improved apparatus and method for processing multiple service requests in a single transmission utilizing urgency indicators.

Figure 1:
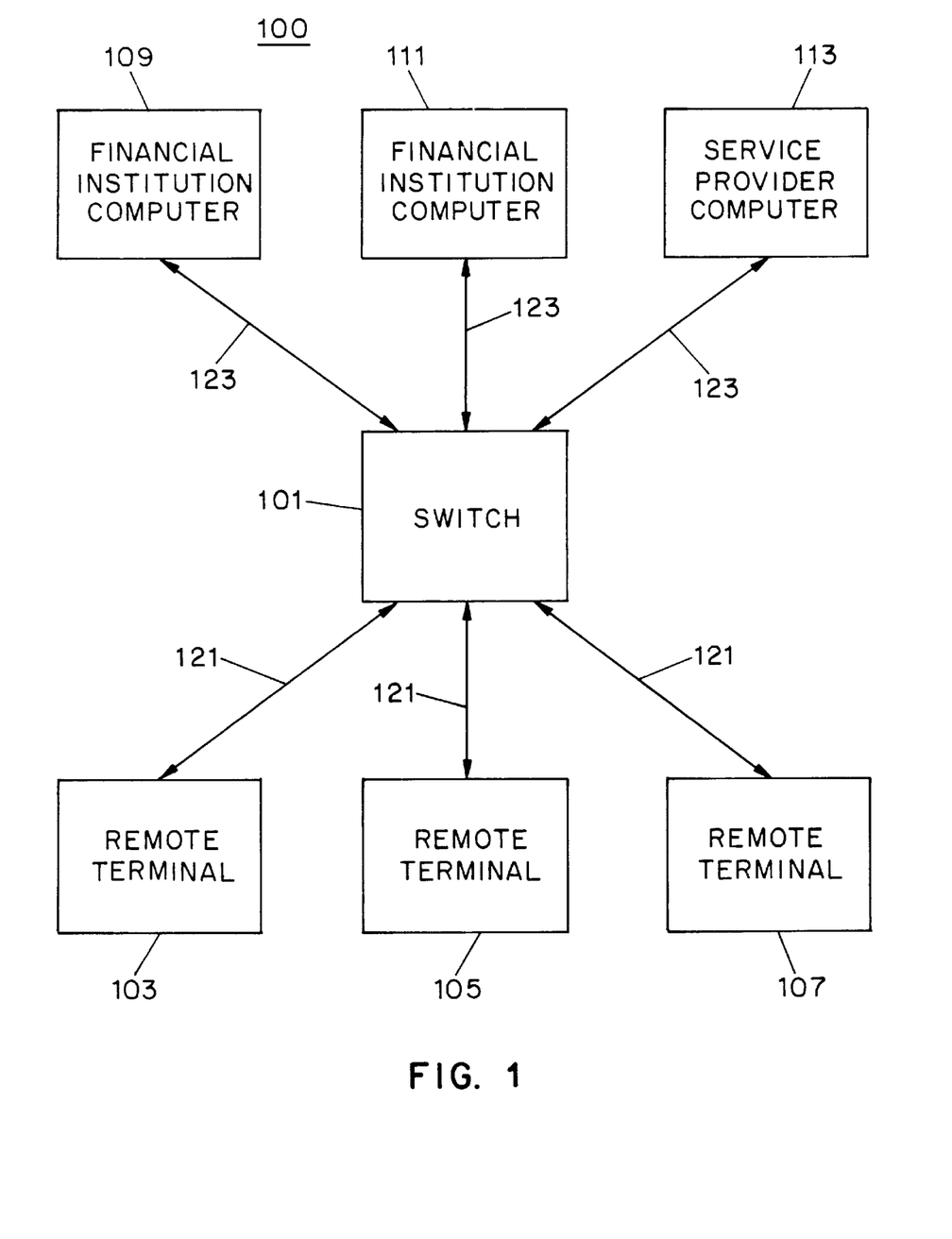
FIG. 1 is a block diagram of the system for processing data groups that contain multiple service requests and associated urgency indicators in accordance with the invention.

FIG. 1 illustrates system 100 which embodies the principles of the invention. System 100 includes a central switch 101, remote access devices 103, 105, and 107, financial institution computers 109 and 111, service provider computer 113 and transmission lines 121 and 123. Switch 101 is a central processing computer which is able to receive data groups, process the received data, send a response signal to the source of the data groups, and send a new data group to a different location based on the contents of the received data. Switch 101 is capable of determining the proper response time for a group of messages, either in an interactive mode or batch mode, from urgency indicators associated with each group of messages contained in the data transmission. The switch is configured to accept data groups that contain multiple service requests made up of a number of instruction messages. Service requests may include financial services such as making a bill payment, funds transfer between accounts, or making a purchase on a home shopping network.

Remote access devices 103, 105, and 107 are devices capable of transmitting and receiving data in accordance with the invention. These devices may include personal computers, telephones, smart phones, personal digital assistants, and interactive televisions. A customer selects the desired electronic service transactions on the remote access device used, and the operating software on the remote device formats the service request using a protocol in accordance with invention. Remote access devices 103, 105, and 107 are representative of any number of remote devices in the system. Remote access devices 103, 105, and 107 are connected to switch 101 via transmission lines 121 which may include standard dial-up, dedicated, or X.25 network telephone lines.

Financial institution computers 109 and 111 perform electronic transactions including financial transactions that the customer has requested upon instruction from switch 101 such as checking a balance, providing product information, or transferring funds. Financial institution computers 109 and 111 are connected to switch 101 via lines 123 which may include an ATM network.

Service provider computer 113 is capable of performing services to fulfill the customer request or realize a sale based on the contents of data transmitted by switch 101 such as selling a current version of device software. An example of performance is shipping goods to a customer based on a customer's order. Service provider computer 113 may also perform financial transactions such as transferring funds to financial institution computer 111 by communicating with switch 101. Service provider computer 113 is connected to switch 101 via transmission line 123 which may include a dedicated, X.25 or dial-up telephone line.

A transaction involving system 100 begins when a customer uses a remote access device (e.g. remote access device 103) and selects a number of different services to perform such as paying bills, transferring funds and making home shopping purchases. Remote access device 103 contains resident software which arranges the message instructions in a data group in accordance with the invention and includes an urgency indicator to indicate the priority of response for each service that needs to be performed. Remote access device 103 then transmits the data group containing the messages to switch 101 via transmission line 121. Switch 101 receives the data group, analyzes the data, and acts on the analyzed data by transmitting requests to financial institution computers 109 and 111 and to service provider computer 113 pursuant to the particular service requests. The switch response priority is controlled by the content of the urgency indicator associated with each batch of service requests. The urgency indicator can represent an interactive process, a batch process, or a process that requires no further response. The response variable in the urgency indicators allows switch 101 to optimize its management of the data transmissions being sent from all the remote access devices using the system. The preferred embodiment of the invention contemplates having many remote access devices transmitting simultaneously and creating a need for efficient processing.

Figure 2:
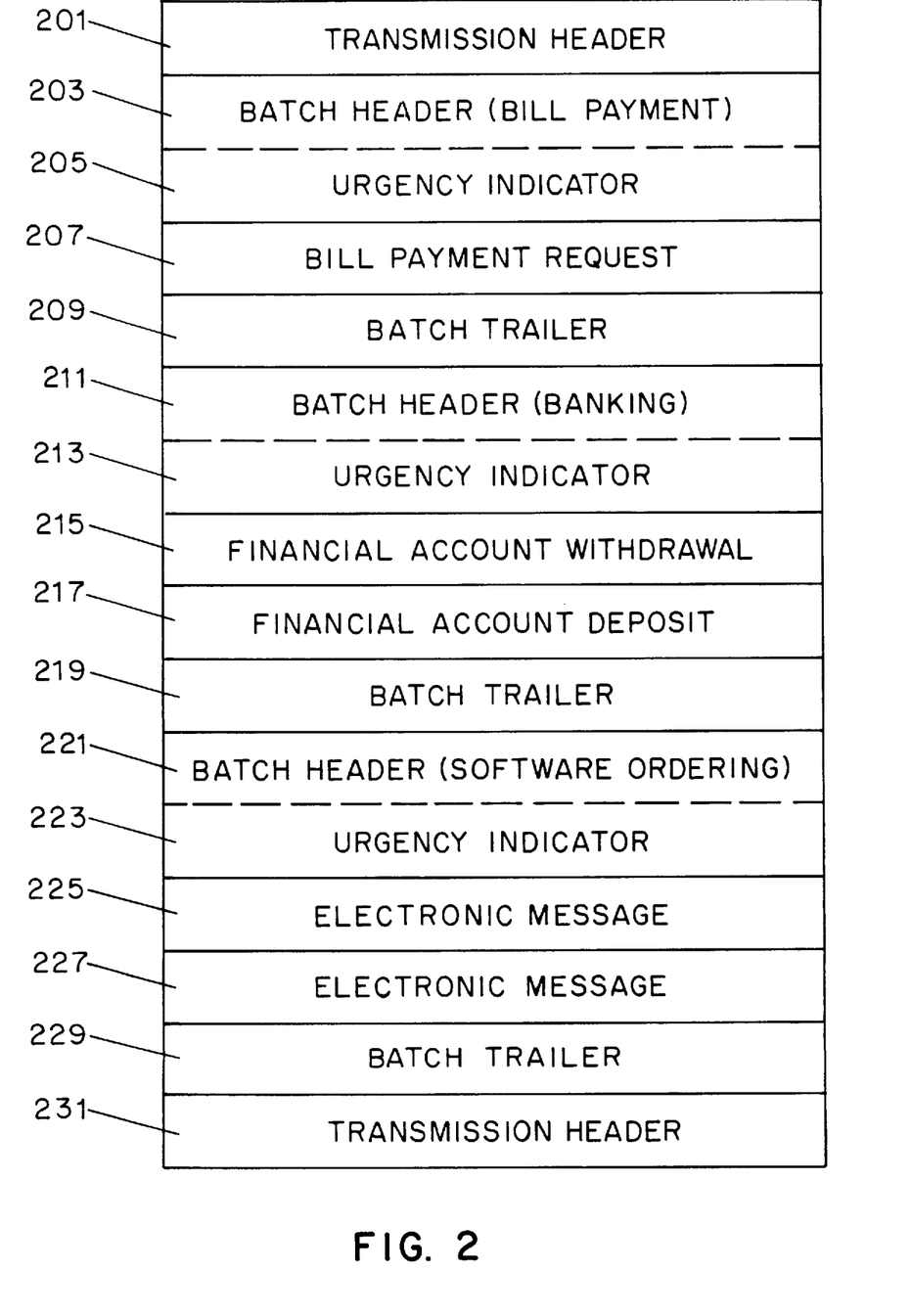
FIG. 2 is an illustration of a constructed data group with three service requests formed in accordance with the invention.

FIG. 2 illustrates the construction of a typical data group for transmission in accordance with the invention. FIG. 2 is only one example from a multitude of possible message combinations still fulfilling the predefined format of the invention. Transmission header 201 is at the beginning of the data group for this communication and indicates the start of the a transaction processing session and also contains customer identification data which is necessary to process the desired transactions. Transmission header 201 can also indicate that the data group is made of test data rather than production data to support the proper testing of access device transmission construction capabilities prior to introducing these messages into the production environment. Batch header 203 follows transmission header 201 and designates the start of a number of messages related to a particular service. In this instance, batch header 203 starts a bill payment service request. Next, urgency indicator 205 is part of batch header 203 and indicates the priority of response required for the service messages associated with batch header 203. The priority of response can be "transaction interactive" and require an immediate response to the access device transmitting the original message, "batch interactive" and require a global response only after all messages in the batch have been received by the switch, or "non-interactive" and require no further response. An example of a request requiring an interactive response is an account balance request where the customer at the remote access device needs an immediate response. An example of a batch interactive response request is scheduling a bill payment for sometime in the future and only needs a later confirmation. A non-interactive response could be an electronic message sent to service provider 113 simply to correspond about service information.

Continuing with the example of FIG. 2, bill payment request 207 is placed next in the data group and is a data message requesting the particular function of paying a customer's bill. Although only one bill payment request message is shown, there could be many requests to pay multiple bills. Other possible messages that can be used are described in FIG. 3 and its associated text. Next, batch trailer 209 indicates the end of messages associated with batch header 203. Following batch trailer 209, batch header 211 indicates a different service to be performed. Urgency indicator 213 follows as part of batch header 211 and determines the appropriate priority of response associated with batch header 211. Urgency indicator 213 can be different than urgency indicator 205. Next, financial account withdrawal 215 is the data message instructing to withdraw a particular amount from a desired account of a requesting customer. Financial account deposit 217 is the corresponding data message which instructs switch 101 to deposit a particular amount in a certain bank account which combined with the withdrawal 215 completes a funds transfer. Additional messages could be present such as a balance inquiry request. Batch trailer 219 then signals the end of the messages associated with batch header 211.

Batch header 221 indicates the start of a service request that is transaction oriented. In this case the service request is for software ordering. Urgency indicator 223 determines the level of response associated with the service request. Next, electronic message 225 is a data message that allows the customer to send a free form message to switch 101, financial institution computer 109, 111, or service provider computer 113. In this case, the electronic message would be sent to a service provider to order a software product. Electronic message 227 enables the customer to send a second message. Batch trailer 227 signals the end of the service request associated with batch header 227. Finally, transmission trailer 231 represents the end of the entire data group transmitted by the customer.

Figure 3:
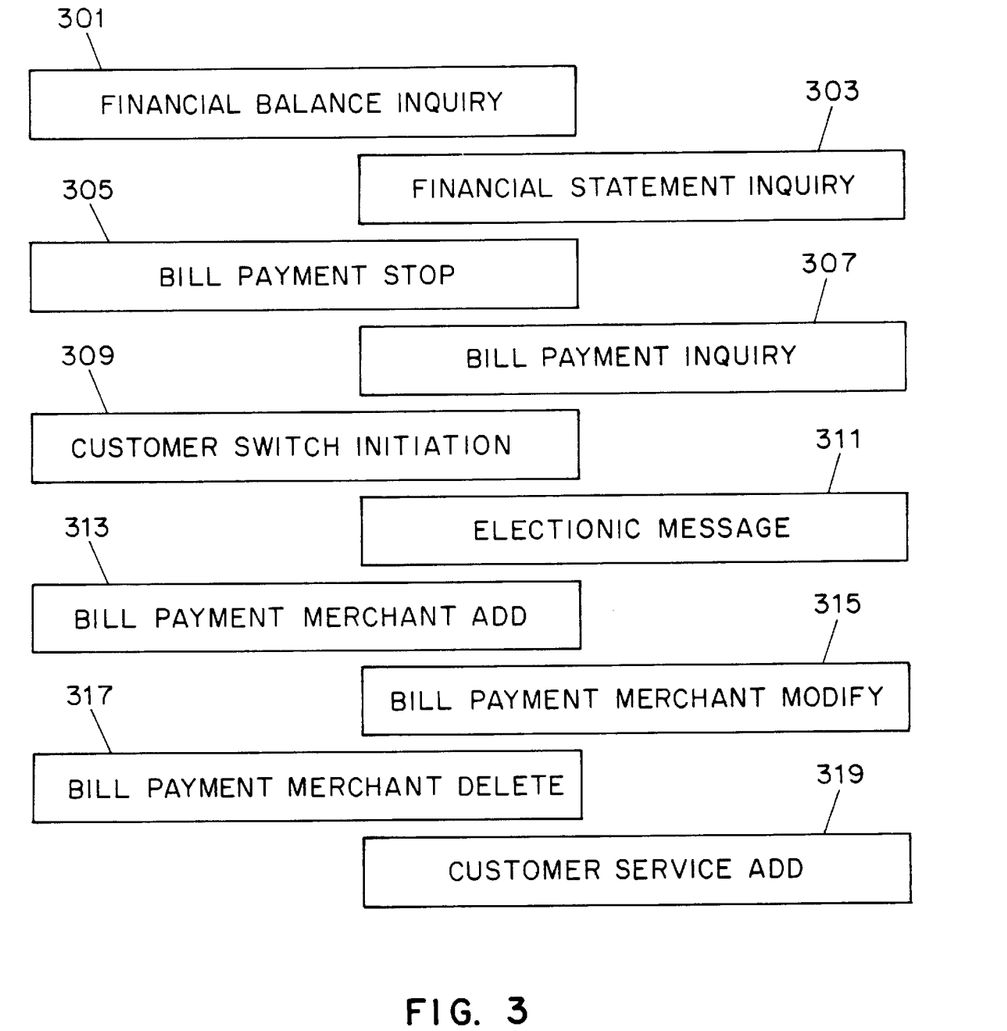
FIG. 3 is a representation of possible messages then can be used in a service request data group in accordance with the invention.

FIG. 3 illustrates a variety of data messages which can be selected as part of a data group to be transmitted in accordance with the invention. The messages in FIG. 3 are representative but not exhaustive of the types of messages accommodated by the invention. The messages can be used in logical combinations with one another according to the invention (see FIG. 2). Financial balance inquiry 301 is used to request an account balance by a customer. Financial statement inquiry 303 is used to request a complete account statement of transactions by a customer including checks, electronic transfer and service charges. Bill payment stop 305 is used to stop payment on a bill that the customer had previously authorized. Bill payment inquiry 307 is a request for a status report on a bill to be paid. Customer service initiation 309 is a message sent to enroll a new customer with the services of switch 101. Electronic message 311 allows a customer to send a free form message in his transmission. Bill payment merchant add 313 adds a merchant to a list of payees which switch 101 can remit payments to for a given customer. Bill payment merchant modify 315 modifies the information associated with a merchant which can be paid, such as a change of address. Bill payment merchant delete 317 removes a merchant from the list of available entities that a customer can transfer funds to. Finally, customer service add 319 adds a new service which can be selected by a customer to be performed. These messages when placed in a data group generated by a remote access device instruct switch 101 to perform the desired financial operations of a customer.

Figure 4:
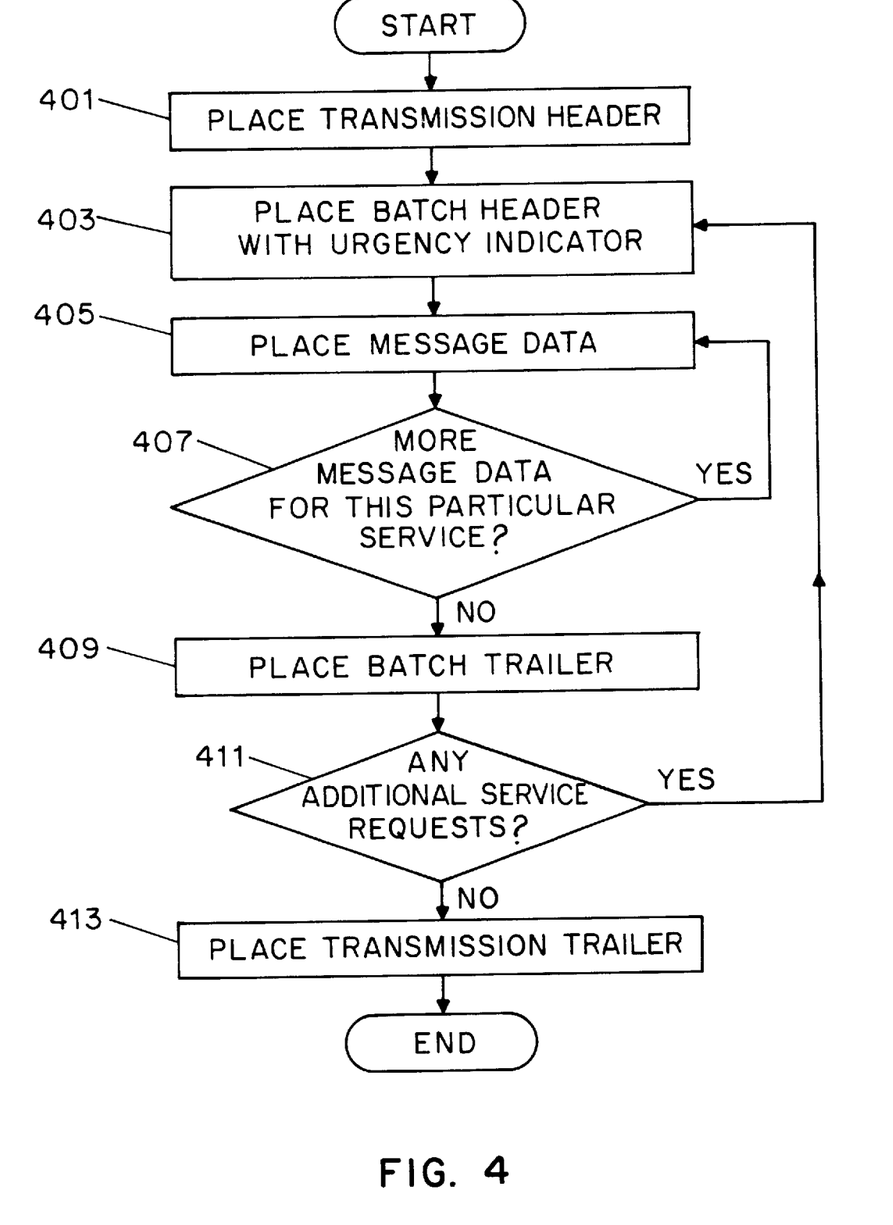
FIG. 4 is a flow chart illustrating a process of constructing a data group of messages including urgency indicators at a access device used in the system of FIG. 1 in accordance with the invention.

FIG. 4 is a flow chart illustrating the process within the resident software of a remote terminal to format service requests in a data group in accordance with the invention. When a customer enters his requests for desired services on a remote access device, the data to be sent to switch 101 is structured according to the protocol. Step 401 first places a transmission header at the start of the data group to be transmitted. In step 403, a batch header with an urgency indicator in next placed in the data group. The batch header indicates the specific service requested for the type of service desired (i.e., purchasing a good or paying a bill). The urgency indicator is defined by the type of service requested or optionally by the customer's preference. In step 405, data messages defining the desired instructions are placed in the data group. The particular form of the data messages depends on which service is selected and the information associated with the individual customer. Some examples of data messages are shown in FIG. 3. Step 407 checks if any additional data messages are required to be transmitted to fully define a particular service. If more data messages are needed, the process returns to step 405. If additional data messages are not required, the process continues to step 409. In step 409, a batch trailer is placed in the data group. The batch trailer corresponds to the previous batch header and indicates there is no more information associated with the service just transmitted. In step 411, remote access device 103 checks if there is any additional service information to be sent. If there is another service requested, then the process goes back to step 403. If there are no additional services, then a transmission trailer is placed in the data group in step 415. The transmission trailer signals the end of the data group transmitted from access device terminal 103.

Figure 5:
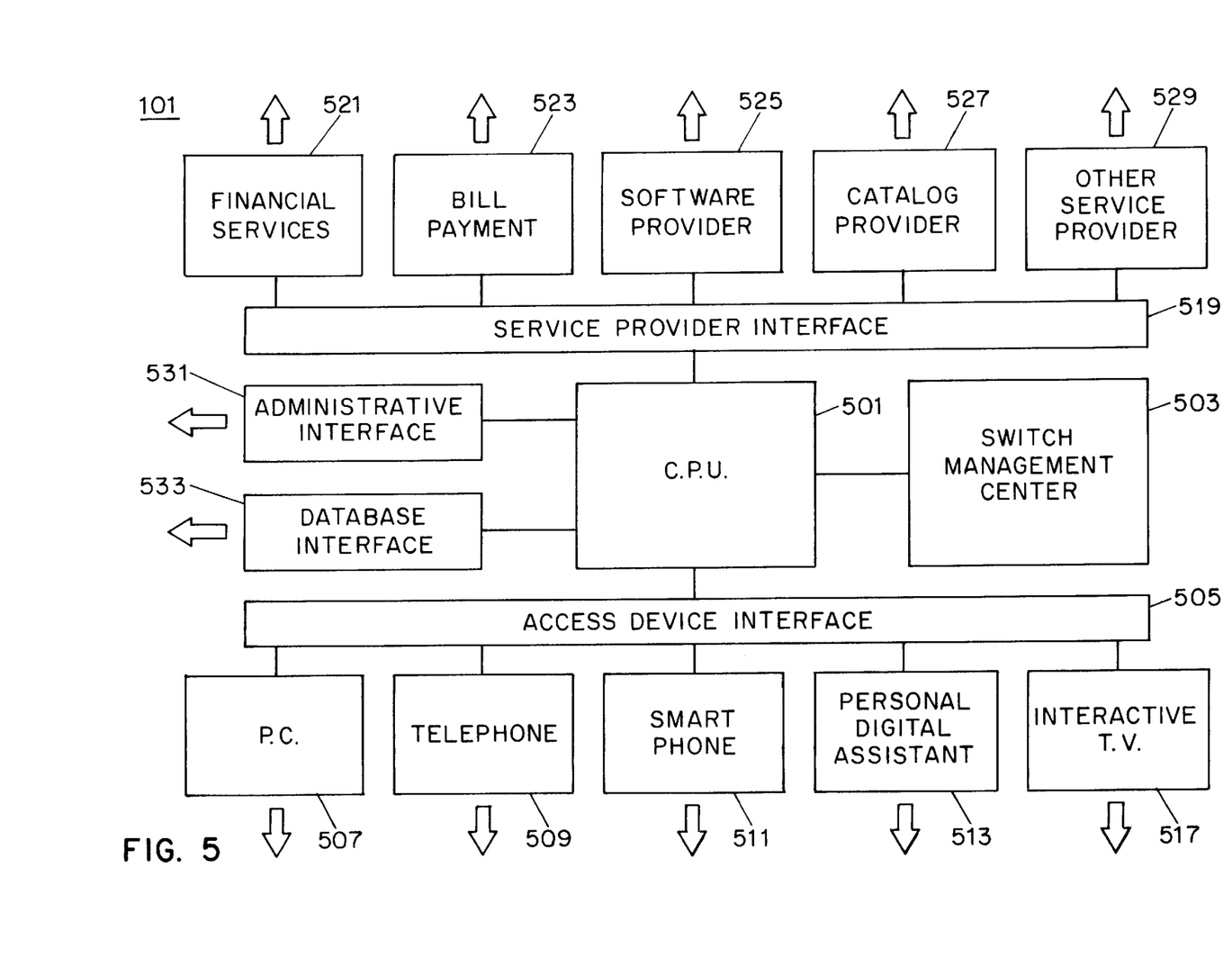
FIG. 5 is a block diagram of a switch used in FIG. 1 in accordance with the invention.

FIG. 5 is a functional representation of switch 101 of FIG. 1. Switch 101 contains central processing unit 501, switch management center 503, access device interface 505, personal computer interface 507, telephone interface 509, smart phone interface 511, personal assistant interface 513, interactive television interface 517, service provider interface 519, bank interface 521, bill payment center interface 523, software provider interface 525, catalog provider interface 527, other service provider interface 529, administrative interface 531 and database interface 533. Central processing unit (CPU) 501 contains a microprocessor and is responsible for the overall operation and processing of switch 101. CPU 501 functions include authentication of transmissions, database management, warehousing, and reporting. Switch management center 503 is connected to CPU 501 and manages and monitors all transmissions coming in and going out of switch 101.

Access device interface 505 is connected to CPU 501 and allows data groups to be transmitted and received in accordance with this invention for a particular type of access device. Personal computer interface 507 is connected to access device interface 505 and allows switch 101 to communicated with personal computers which send service requests. Telephone interface 509 is connected to access device interface 505 and allows communication between switch 101 and touch tone telephones in order to process service requests. Smart phone interface 511 is connected to access device interface 505 and enables data transmission between switch 101 and smart phones, or phones with data displays. Personal assistant interface 513 is connected to access device interface 505 and allows communication between switch 101 and computer personal assistants, which are small portable computers. Interactive television interface 517 is connected to access device interface 505 and allows switch 101 to communicate with interactive televisions which allow data entry on normal television sets.

Service provider interface 519 is connected to CPU 501 and allows data groups to be transmitted and received in accordance with this invention for a particular type of service provider. The data groups are constructed to carry out service requests made from remote access devices. Financial services interface 521 is connected to service provider interface 519 and allows switch 101 to communicate with financial service institutions such as banks. Bill payment interface 523 is connected with service provider interface 519 and allows communication between switch 101 and bill payment processing centers to transmit instructions regarding a customer's bill payment preference or request. Bill payment processing can also be performed at switch 101 itself. Software provider interface 525 is connected to service provider interface 519 and enables communication between switch 101 and a software provider which can transmit software updates to fulfill a service request made by a customer at a remote access device. Catalog provider interface 527 is connected to service provider 519 and allows communication between switch 101 and a catalog provider to fulfill service requests of customers such as catalog shopping. Other service provider interface 519 is connected to service provider interface 519 and allows communication between switch 101 and other service providers in fields such as entertainment, publications, and food services. These interfaces allow customers to select from a multitude of different service requests all processed by a central switch.

Administrative interface 531 is connected to CPU 501 and allows communication between switch 101 and service provider administrators in order to transmit administrative requests such as adding a new service or adding a customer to a service list. While service requests generated from customers at remote access devices are processed and transmitted through service provider interface 519, service providers can send transmissions from their own personal computers or equivalents through administrative interface 531. Database interface 533 is connected to CPU 501 and allows communications between switch 101 and external databases that may contain customer or service provider information.

Figure 6:
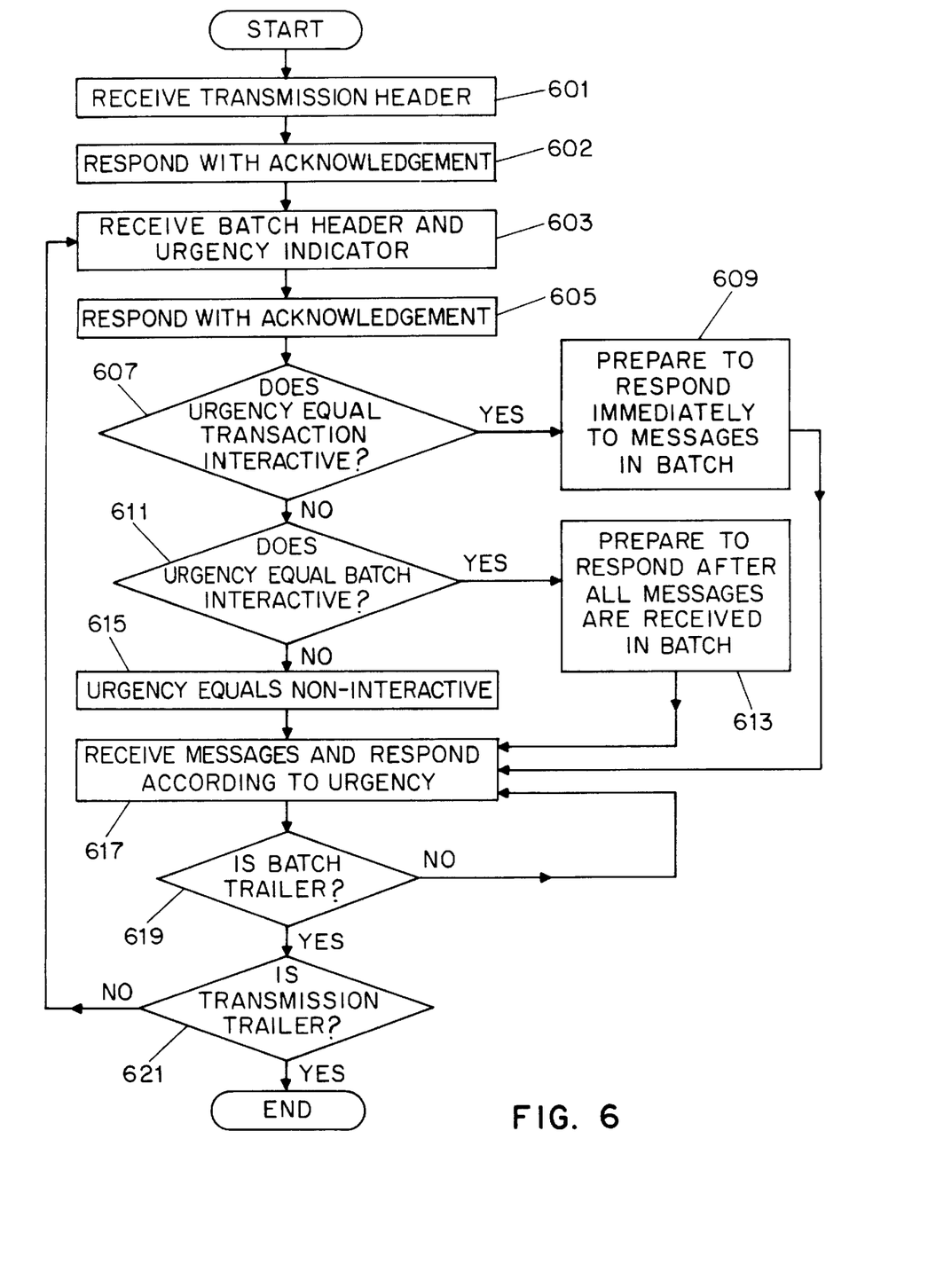
FIG. 6 is a flow chart illustrating a process of receiving and analyzing data groups by the switch of FIG. 5 in accordance with the invention.

FIG. 6 illustrates the process performed by switch 101 when receiving data groups from remote terminals using the protocol in accordance with the invention. In step 601, switch 101 receives a transmission header indicating the beginning of a transmission. The transmission header contains data indicating the identity of the source of the data group. In step 602, a transmission header acknowledgement is transmitted back to the originating remote terminal to indicate the transmission should continue. In step 603, switch 101 receives a batch header indicating an incoming group of messages relating to a particular service (e.g. such as bill payment). The urgency indicator associated with the service group is also received as part of the batch header. In step 605, switch 101 responds to the batch header with an acknowledgement to the remote terminal indicating the batch header was received. Switch 101 analyzes the urgency indicator to determine the proper level of response. The urgency indicator is first compared to determine if the response should be interactive. If the indicator represents "transaction interactive" in step 607, switch 101 will respond to the incoming information of the service group in step 609 as soon as it is received. The process then skips to step 617. If the indicator does not represent "transaction interactive" in step 607, the urgency indicator will be compared to determine if it indicates "batch interactive" in step 611. If the urgency indicator does indicate batch interactive, then the messages in the service group will be responded to as a group immediately after the entire service request is received by the switch. Batch interactive priority would be appropriate for transactions that do not require unique responses, confirmation codes or return data. The process then skips to step 617. If the urgency indicator does not indicate "batch interactive", then the urgency indicator must represent "non-interactive" in accordance with this preferred embodiment. In this mode, switch 101 will not send an individual or group response to this set of messages because the urgency indicator signals no response is necessary in step 615. Other embodiments may have additional urgency indicators.

In step 617, a data message is read which contains data elements forming a set of instructions. An example of a message is "bill payment request". In step 619, the next message is checked to determine if it is a batch trailer. If it is not, switch 101 receives another data message with instructions in step 617. If the message is a batch trailer, switch 101 recognizes that there are no more messages for the particular service. Switch 101 next checks if the next data in the data group is a transmission trailer in step 621. If it is not, then switch 101 receives the next batch header for another selected service in step 603 and associated messages. If it is the transmission trailer, switch 101 is signaled that it is the end of the data group. Each service request is either responded to immediately or as a group in order to gain maximum processing efficiency.

The foregoing merely illustrates the principles of the invention. It will thus be appreciated that those skilled in the art will be able to devise numerous systems and methods which, although not explicitly shown or described herein, embody the principles of the invention and thus within the spirit and scope of the invention.

We claim:

1. An apparatus for processing incoming and outgoing data groups of information comprising:

means for receiving said incoming data groups, at least one incoming data groups comprising a plurality of service requests, each service request within said data group including a respective discrete urgency indicator indicative of a priority of response to the service request; and means responsive to the service requests for transmitting outgoing data groups in a manner indicated by said urgency indicator of each said service request.

2. The apparatus of claim 1, wherein said means for transmitting includes generating one or more of said outgoing data groups.

3. The apparatus of claim 2, wherein said outgoing data groups are transmitted to a remote access device, wherein said remote access device generates and transmits said incoming data groups to said apparatus.

4. The apparatus of claim 2, wherein said outgoing data groups are transmitted to a host computer, wherein said host computer generates and transmits said incoming data groups to said apparatus.

5. The apparatus according to claim 2, wherein said service requests include financial service requests.

6. The apparatus of claim 5, further comprising means for reading the financial service requests and analyzing said discrete urgency indicators of each said service request.

7. The apparatus of claim 6, wherein said manner indicated by said discrete urgency indicator includes no transmissions by said transmitting means in response to said service request.

8. The apparatus of claim 1, wherein said urgency indicators comprise transaction interactive, batch interactive, and non-interactive modes.

9. A system for processing data groups comprising:

an access device for generating first data groups, at least one of said first data groups comprising a plurality of service requests and a discrete urgency indicator indicative of a priority of response associated with each said service request; and a switch comprising means for receiving said first data group from said access device, analyzing said first data group, constructing second data groups based upon the contents of said first data group and transmitting said second data groups in a manner indicated by said associated discrete urgency indicators.

10. The system of claim 9, wherein said service requests include financial service requests.

11. The system of claim 9, wherein said urgency indicators comprise transaction interactive, batch interactive, and non-interactive modes.

12. The system of claim 9, further comprising a host computer for receiving said second data groups, wherein said host computer receives said second data groups from said switch, analyzes said second data groups and performs operations based upon the contents of said second data groups.

13. The system of claim 12, wherein said host computer comprises a financial institution computer.

14. The system of claim 12, wherein said host computer comprises a service provider computer.

15. A method of constructing a data group of information for a plurality service requests comprising the steps of:

placing data indicating a transmission header at the front of said data group;

placing in order a plurality of messages for each said service requested comprising a batch header, at least one message defining an instruction, and a batch trailer at the next location in the data group, wherein each said batch header includes an associated discrete urgency indicator to indicate a priority of response for said service requested;

placing data indicating a transmission trailer at the end of said data group;

wherein said urgency indicator comprises transaction interactive, batch interactive and non-interactive modes.

16. A method for processing incoming and outgoing data groups of information comprising:

receiving said incoming data groups, at least one incoming data groups comprising a plurality of service requests, each service request including a respective discrete urgency indicator indicative of a priority of response to the financial service request; and responding to the service requests by transmitting outgoing data groups in a manner indicated by said urgency indicator of each said service request.

17. The method of claim 16, wherein said responding step includes generating one or more of said outgoing data groups.

18. The method of claim 16, wherein said urgency indicator comprises transaction interactive, batch interactive, and non-interactive modes.

19. The method of claim 16, where said service requests comprise financial service requests.

* * * * *